(12) United States Patent
Yoo

(10) Patent No.: US 9,806,321 B2
(45) Date of Patent: Oct. 31, 2017

(54) ELECTRODE ASSEMBLY HAVING COMPACT ELECTRODE TABS AND SECONDARY BATTERY USING THE SAME

(71) Applicant: Samsung SDI Co., Ltd., Yongin-si, Gyeonggi-do (KR)

(72) Inventor: Kyung-Mo Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 97 days.

(21) Appl. No.: 14/798,088

(22) Filed: Jul. 13, 2015

(65) Prior Publication Data

US 2015/0318534 A1 Nov. 5, 2015

Related U.S. Application Data

(62) Division of application No. 12/964,721, filed on Dec. 9, 2010, now abandoned.

(Continued)

(51) Int. Cl.
*H01M 2/26* (2006.01)
*H01M 10/052* (2010.01)
(Continued)

(52) U.S. Cl.
CPC .......... *H01M 2/26* (2013.01); *H01M 2/1061* (2013.01); *H01M 2/266* (2013.01); *H01M 2/30* (2013.01);
(Continued)

(58) Field of Classification Search
None
See application file for complete search history.

(56) References Cited

U.S. PATENT DOCUMENTS

2002/0146620 A1 10/2002 Connell
2003/0228515 A1 12/2003 Woehrle et al.
(Continued)

FOREIGN PATENT DOCUMENTS

CN 1466236 A 1/2004
EP 1 369 939 A2 12/2003
(Continued)

OTHER PUBLICATIONS

Extended European Search Report dated Apr. 5, 2011 issued in EP Application No. 10196582.0, 4 pages.
(Continued)

*Primary Examiner* — Ula C Ruddock
*Assistant Examiner* — Tony Chuo
(74) *Attorney, Agent, or Firm* — Lewis Roca Rothgerber Christie LLP

(57) ABSTRACT

An embodiment of the present invention provides an electrode assembly in which a plurality of electrode tabs is made more compact inside an exterior case and a secondary battery using the same. An electrode assembly according to the embodiment of the present invention includes: a plurality of first plates of a first polarity; a plurality of second plates of a second polarity alternately arranged with the first plates; at least one of a plurality of first tabs or a plurality of second tabs extending from the first plates or the second plates, respectively, the at least one of the plurality of first tabs or the plurality of second tabs being together wound or bent more than once; a plurality of separators interposed between the first plates and the second plates; and a lead physically coupled to at least one of the first tabs or the second tabs.

8 Claims, 5 Drawing Sheets

Related U.S. Application Data

(60) Provisional application No. 61/306,396, filed on Feb. 19, 2010.

(51) Int. Cl.
  H01M 2/10 (2006.01)
  H01M 2/30 (2006.01)
  H01M 2/02 (2006.01)

(52) U.S. Cl.
  CPC ........ H01M 10/052 (2013.01); *H01M 2/0217* (2013.01); *H01M 2220/30* (2013.01)

(56) References Cited

U.S. PATENT DOCUMENTS

| | | |
|---|---|---|
| 2003/0232243 A1 | 12/2003 | Hong |
| 2004/0038125 A1 | 2/2004 | Kim et al. |
| 2008/0028598 A1 | 2/2008 | Hong |
| 2009/0017376 A1 | 1/2009 | Yamamura et al. |
| 2010/0028770 A1 | 2/2010 | Ryu et al. |

FOREIGN PATENT DOCUMENTS

| | | |
|---|---|---|
| EP | 1 387 419 A2 | 2/2004 |
| EP | 2 239 802 A1 | 10/2010 |
| JP | 2002-298825 | 10/2002 |
| JP | 2004-014516 | 1/2004 |
| JP | 2004-087337 | 3/2004 |
| JP | 2004-241328 | 8/2004 |
| JP | 2008-27891 | 2/2008 |
| JP | 2009-038004 | 2/2009 |
| JP | 2009-187768 | 8/2009 |
| KR | 10-2003-0095519 A | 12/2003 |
| KR | 2004-0107040 | 12/2004 |
| KR | 10-2006-0033643 A | 4/2006 |
| WO | WO 2010/030606 A2 | 3/2010 |

OTHER PUBLICATIONS

JPO Office action dated Mar. 19, 2013, for corresponding Japanese Patent application 2011-033173, (3 pages).

KIPO Office Action dated Jul. 18, 2012 corresponding to KR 10-2011-0014165, 5 pages.

KIPO Office action dated Jan. 14, 2013, for corresponding Korean Patent application 10-2011-0014165, (3 pages).

Office action for Korean Patent Application No. 10-2011-0014165 issued on Jul. 12, 2013.

SIPO Office action dated May 28, 2013 in corresponding CN Application No. 201110041859.3 (8 pages).

EPO Examination report dated Sep. 1, 2016, for corresponding European Patent Application 10 196 582.0, (4 pages).

ELECTRODE ASSEMBLY HAVING COMPACT ELECTRODE TABS AND SECONDARY BATTERY USING THE SAME

CROSS-REFERENCE TO RELATED APPLICATIONS

This application is a divisional of U.S. application Ser. No. 12/964,721, filed on Dec. 9, 2010, which claims priority to and the benefit of U.S. Provisional Application No. 61/306,396 filed on Feb. 19, 2010, in the United States Patent and Trademark Office, the entire contents of both of which are incorporated herein by reference.

BACKGROUND

1. Field

An embodiment of the present invention relates to an electrode assembly and a secondary battery using the same.

2. Description of the Related Art

Recently, as portable electronic apparatuses have been miniaturized and lightened, research has been performed on a secondary battery as a driving power source. In particular, as portable wireless apparatus products including a cellular phone, a notebook computer, a personal digital assistant, etc. become lighter and more powerful, the importance of the battery used as driving power sources of the products is increasing.

Since the secondary battery can repeatedly be used through repetition of charging and discharging, the secondary battery is more economical than a primary battery. Further, the secondary battery has a high capacity and can be miniaturized and thus the secondary battery may have a high operating voltage and a high energy density per unit weight, the secondary battery is widely being used in high-tech electronic apparatuses.

However, a lithium secondary battery is rapidly growing in its applications because of its operating voltage of 3.7V, which is three times higher than a nickel-cadmium battery or a nickel-metal hydride battery that are now commonly used as a power source for portable electronic equipment, and because of its high energy density per unit weight.

In general, in regard to shape, there is high demand for a secondary battery such as a can-type battery or a pouch-type battery having a thin (or small) thickness which can be applied to devices such as the cellular phones and, in regard to materials, there is a high demand for a secondary battery such as a lithium polymer battery because of its advantages in energy density, discharge voltage, and stability (or safety).

As such, an electrode assembly housed in a can-type or pouch-type exterior case (or housing) includes an anode plate and a cathode plate and a structure (e.g., a separator) sequentially laminated or wound with the anode plate and the cathode plate and being interposed therebetween. In the laminate-type electrode assembly, electrode tabs extend from and are fused to the anode plate and the cathode plate and are electrically connected with anode and cathode electrode leads, respectively. In addition, a part of each of the electrode leads is exposed out of the can or pouch-type exterior case and electrically connected with a protection circuit module in a subsequent process.

However, since the electrode tabs may extend from the anode plate and the cathode plate in a line to be electrically connected with the electrode lead, the electrode tabs occupy a large space in the exterior case, thereby reducing the utilization of the inner space of the exterior case.

SUMMARY

An aspect of an embodiment of the present invention is directed toward a secondary battery that is implemented as a laminate type.

Aspects of embodiments of the present invention are directed toward an electrode assembly in which a plurality of electrode tabs is made more compact by overlapping and bending and/or winding the plurality of electrode tabs in an exterior case and a secondary battery using the same.

According to an embodiment of the present invention, an electrode assembly includes: a plurality of first plates of a first polarity; a plurality of second plates of a second polarity alternately arranged with the first plates; at least one of a plurality of first tabs or a plurality of second tabs extending from the first plates or the second plates, respectively, the at least one of the plurality of first tables or the plurality of second tabs being together would or bent more than once; a plurality of separators interposed between the first plates and the second plates; and a lead physically coupled to at least one of the first tabs or the second tabs.

The first plates, the second plates, and the separators between the first plates and the second plates may be laminated together.

The at least one of the plurality of first tabs or the plurality of second tabs may be wound in a clockwise or counter-clockwise direction.

The at least one of the plurality of first tabs or the plurality of second tabs may extend from the first plates or the second plates, respectively, by different draw-out lengths. The different draw-out lengths of the at least one of the plurality of first tabs or the plurality of second tabs may sequentially increase from a first side of the electrode assembly to a second side of the electrode assembly.

The at least one of the plurality of first tabs or the plurality of second tabs may be located between end points defining the thickness of the electrode assembly.

The at least one of the plurality of first tabs or the plurality of second tabs may be together wound and bent at least once as both a wound portion and a bent portion.

The at least one of the plurality of first tabs or the plurality of second tabs may be bent as the bent portion and thereafter, may be wound in a clockwise or counterclockwise direction as the wound portion.

The wound portion may be more distal to the first plates or the second plates than the bent portion is to the first plates or the second plates.

The lead may be physically coupled to the at least one of the plurality of first tabs or the plurality of second tabs at a location between the bent portion and the wound portion.

The wound portion and the bent portion may be both located between end points defining the thickness of the electrode assembly.

The lead may be wound together with the at least one of the plurality of first tabs or the plurality of second tabs.

A secondary battery may include the electrode assembly and a case enclosing the first plates, the second plates, the first tabs, the second tabs, and the separators and may partially enclose the lead, the lead being physically coupled to the at least one of the first tabs or the second tabs only at a region within the case.

According to another embodiment of the present invention, an electrode assembly includes: a plurality of first plates of a first polarity; a plurality of second plates of a second polarity alternately arranged with the first plates; at least one of a plurality of first tabs or a plurality of second tabs extending from the first plates or the second plates, respectively, and being bent together in a direction toward the first plates or the second plates, respectively, as a bent portion of the first tabs or the second tabs; a plurality of separators interposed between the first plates and the second plates; and a lead physically coupled to the bent portion.

A secondary battery may include the electrode assembly and a case enclosing the first plates, the second plates, the first tabs, the second tabs, and the separator and may partially enclose the lead, the lead being physically coupled to the bent portion only at a region within the case.

According to another embodiment of the present invention, an electrode assembly includes: a plurality of first plates of a first plurality; a plurality of second plates of a second polarity alternately arranged with the first plates; at least one of a plurality of first tabs or a plurality of second tabs extending from the first plates or the second plates, respectively, as a bent portion of the first tabs or the second tabs, a plurality of separators interposed between the first plates and the second plates; and a lead physically coupled to the bent portion.

The at least one of the plurality of first tabs or the plurality of second tabs may be bent in an inverse draw-out direction of the at least one of the plurality of first tabs or the plurality of second tabs from the first plates or the second plates, respectively, and again may be bent in a draw-out direction of the first tabs or the second tabs from the first plates or the second plates.

A first bend of the bent portion may bend the at least one of the plurality of first tabs or the plurality of second tabs toward the first plates and a second bend of the bent portion may bend the at least one of the plurality of first tabs or the plurality of second tabs away from the first plates.

A secondary battery may include the electrode assembly and a case completely enclosing the first plates, the second plates, the first tabs, the second tabs, and the separator and may partially enclose the lead, the lead being physically coupled to the bent portion only at a region within the case.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
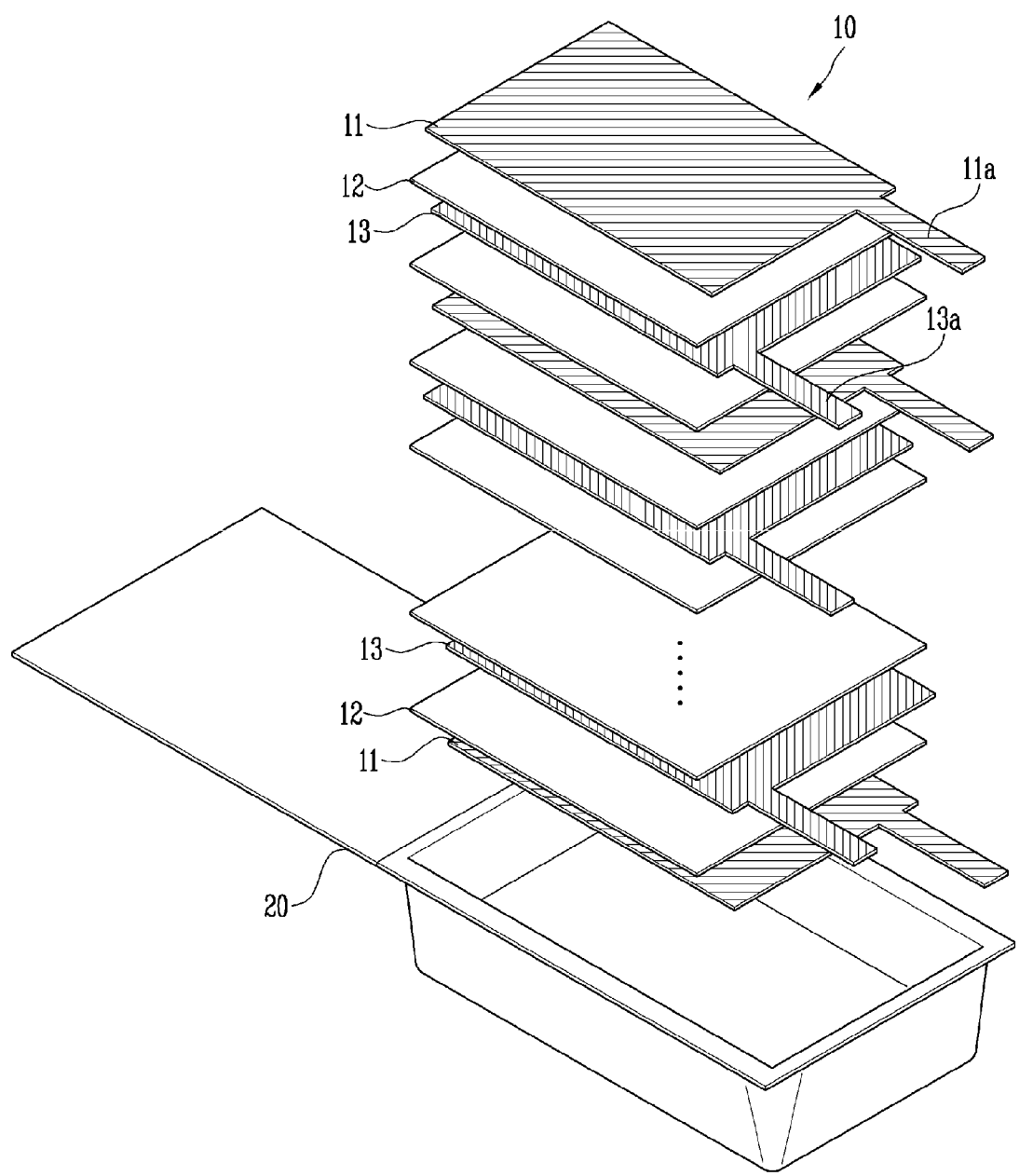
FIG. 1 is an exploded perspective view of a secondary battery according to a first embodiment of the present invention.

In the following detailed description, only certain exemplary embodiments of the present invention have been shown and described, by way of illustration. As those skilled in the art would recognize, the described embodiments may be embodied in many different forms and should not be construed as being limited to the embodiments set forth herein. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Like reference numerals refer to like elements throughout the specification.

Hereinafter, an electrode assembly and a secondary battery using the same according to an embodiment of the present invention will be described in detail with reference to the accompanying drawings illustrating embodiments of the present invention.

Terms used in the embodiment of the present invention will first be defined before describing the drawings. In the context of the present application, bending refers to a state in which an electrode tab is bent, and winding refers to a state in which the electrode tab is spirally wound. In addition, a draw-out direction of the electrode tab refers to a direction where a lead is positioned (i.e., a direction heading away from the electrode assembly) and an inverse draw-out direction of the electrode tab refers to a direction where the electrode assembly is positioned (i.e., a direction heading toward the electrode assembly).

FIG. 1 is an exploded perspective view of a secondary battery according to a first embodiment of the present invention.

Referring to FIG. 1, in an electrode assembly 10, an anode plate 11 and a cathode plate 13 which are applied with active materials are alternately disposed and laminated with a separator 12 interposed therebetween. Anode tabs 11*a* which extend from one side are formed on the anode plate 11 and cathode tabs 13*a* which extend from the other side in the same direction as the anode tabs 11*a* are formed on the cathode plate 13.

Although a laminate-type electrode assembly is shown in the first embodiment of the present invention, another electrode assembly having a structure in which a plurality of electrode tabs are overlapped with each other may also be formed.

Although they may be formed in other ways, depending on the type of the secondary battery, the anode plate 11 and the cathode plate 13 are generally formed by applying and fixing the active materials to and/or into metallic materials, and drying, roll-pressing, and cutting the materials. In one embodiment, the anode plate 11 and the cathode plate 13 are fabricated by coating an aluminum metal foil and a copper metal foil, respectively, with slurries and drying them. The slurries include the active materials of the anode plate 11 and the cathode plate 13 and a fixing agent which allows the active materials to adhere to the metal foils. In the case of a lithium secondary battery, an oxide containing lithium may be primarily used as an anode active material and any one of hard carbon, soft carbon, graphite, and a carbon substance may be primarily used as a cathode active material, but the present invention is not limited to lithium secondary batteries.

The separator 12 is interposed between the anode plate 11 and the cathode plate 13. An insulating thin film having high ion permeability and high mechanical strength is used. Diameters of pores of the separator 12 are generally in the range of 0.01 to 10 μm and the thickness of the separator 12 is generally in the range of 5 to 300 μm. A sheet or a non-woven fabric made of an olefinic polymer such as chemical-resistant and hydrophobic polypropylene, a glass fiber, or polyethylene may be used as the separator 12. In the case in which a solid electrolyte such as a polymer, etc. is used as an electrolyte, the solid electrolyte may also serve as the separator 12.

In addition, a pouch case 20 has a receiving space which can house the electrode assembly 10. The pouch case 20 is generally formed on the top and bottom of an aluminum thin-film to have a laminate structure. An inner surface of the pouch case 20 is made of a heat adhesive resin.

Figure 2:
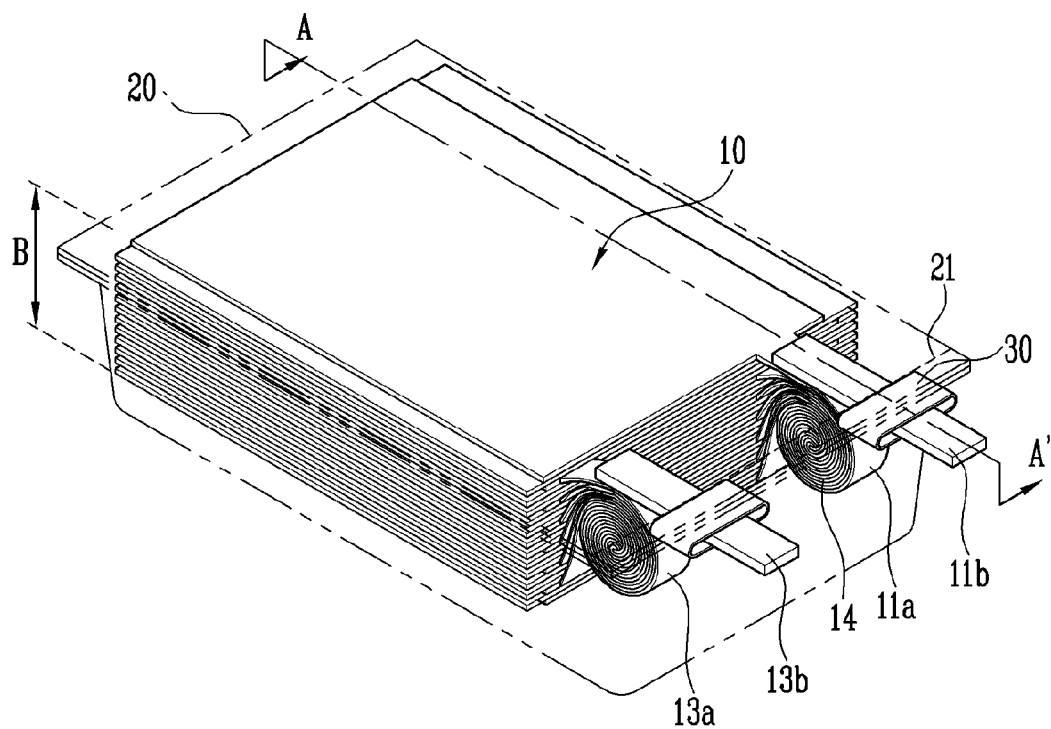
FIG. 2 is a perspective view of a secondary battery according to the first embodiment of the present invention.
Figure 3:
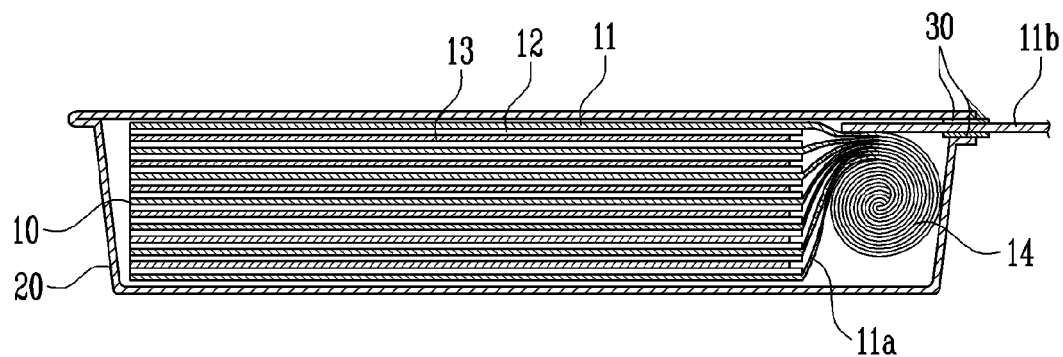
FIG. 3 is a cross-sectional view taken along line A-A' of FIG. 2.

FIG. 2 is a perspective view of a secondary battery according to a first embodiment of the present invention and FIG. 3 is a cross-sectional view taken along line A-A' of FIG. 2.

Referring to FIGS. 2 and 3, when the electrode assembly 10 is received in the receiving space of the pouch case 20, a part of each of an anode lead 11b bonded to the anode tab 11a and a part of a cathode lead 13b bonded to the cathode tab 13a is exposed outside the pouch case 20. An insulating tape 30 for ensuring electrical insulation while increasing airtightness with the pouch case 20 is attached to the portions of the anode lead 11b and the cathode lead 13b that are in contact with the pouch case 20.

In the electrode assembly 10, the anode plates 11 with the extending anode tab 11a and the cathode plates 13 with the extending cathode tab 13a are alternately disposed and the separators 12 are interposed therebetween. The anode tabs 11a and the cathode tabs 13a are connected to the anode lead 11b and the cathode lead 13b, respectively, the anode tabs and the cathode tabs each being wound together (e.g., in a clockwise direction). After the anode tabs 11a and the cathode tabs 13a are wound, a wound section 14 may be positioned inside a width B or between end points defining the thickness of the electrode assembly 10.

Accordingly, a space occupied by the anode tabs 11a and the cathode tabs 13a is reduced in an inner space of an airtight section 21 of the pouch case 20, thereby improving spatial utilization. That is, a battery capacity may be improved by increasing the sizes of the anode plate 11 and the cathode plate 13 in the remaining space (or the space that would otherwise have been occupied by the anode and cathode tabs) of the airtight section 21 and the size of a final product may be reduced by forming the pouch case 20 smaller.

As described above, the pouch case 20 is generally formed on the top and bottom of the aluminum thin-film to have a laminate structure covered with nylon, a synthesis resin such as polypropylene or polyethylene, etc. The inner surface of the pouch case 20 is made of a heat adhesive resin for airtightness. As a result, the heat adhesive resin coated on the inner surface of the pouch case 20 is fused with the pouch case 20 by heating and pressing to make the pouch case 20 airtight.

Figure 4:
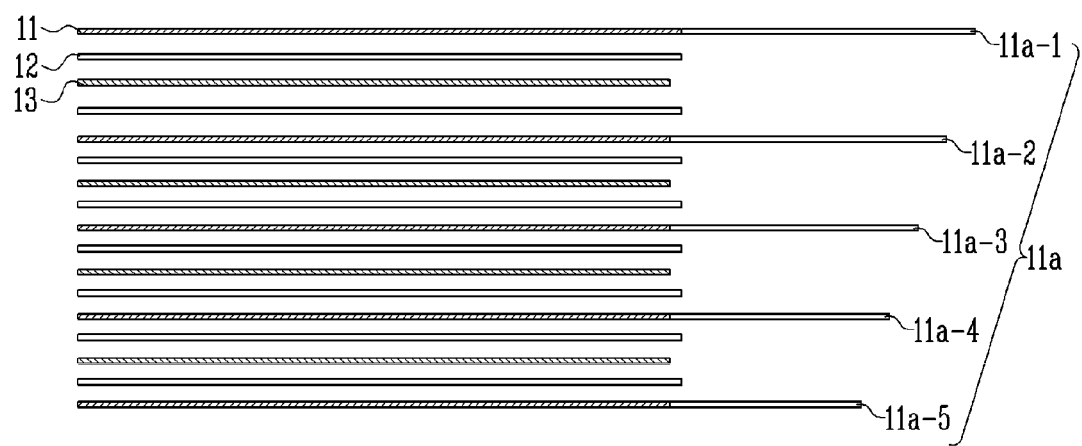
FIG. 4 is an exploded cross-sectional view of an electrode assembly according to a second embodiment of the present invention.

FIG. 4 is an exploded cross-sectional view of an electrode assembly according to a second embodiment of the present invention.

Referring to FIG. 4, draw-out lengths of the anode tabs 11a are different from each other. Herein, when the anode tabs 11a are wound or bent, an anode tab 11a-5 positioned at the innermost side has the shortest length and an anode tab 11a-1 positioned at the outermost side has the longest length for convenience of a process (e.g., a manufacturing process). That is, the anode tab 11a-5 positioned at the innermost side and the anode tab 11a-1 positioned at the outermost side and anode tabs 11a-4, 11a-3, and 11a-2 sequentially positioned therebetween have lengths in which the length of the anode tab 11a-1 is longer than that of the anode tab 11a-2, the length of the anode tab 11a-2 is longer than that of the anode tab 11a-3, the length of the anode tab 11a-3 is longer than that of the anode tab 11a-4, and the length of the anode tab 11a-4 is longer than that of the anode tab 11a-5.

Although the cathode tabs 13a drawn out from the cathode plate 13 are not shown, draw-out lengths of the cathode tabs 13a may be different from each other in a manner identical or substantially identical to that of the anode tabs 11a.

Figure 5:
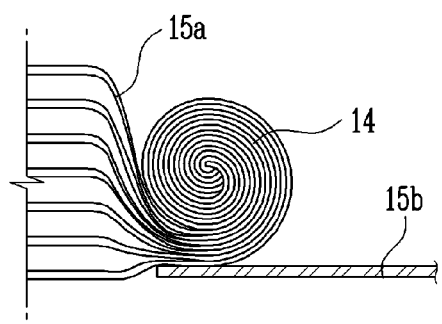
FIG. 5 is a cross-sectional view showing a wound electrode tab and a lead which are bonded to each other according to a third embodiment of the present invention.

FIG. 5 is a cross-sectional view showing a wound electrode tab and a lead which are bonded to each other according to a third embodiment of the present invention.

Referring to FIG. 5, electrode tabs 15a drawn out from an electrode plate are wound in a counterclockwise direction and thereafter, a lead 15b is electrically connected to the bottom of the wound section 14. The lead 15b is connected with the wound section 14 on the top of the wound section 14. The wound section 14 and the lead 15b may be connected to each other by welding and the electrode tabs 15a are positioned inside the width of the electrode assembly or between end points defining the thickness of the electrode assembly.

Figure 6:
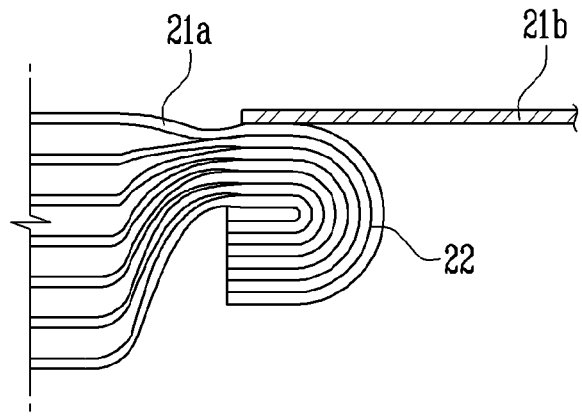
FIG. 6 is a cross-sectional view showing a bent electrode tab and a lead which are bonded to each other according to a fourth embodiment of the present invention.

FIG. 6 is a cross-sectional view showing a bent electrode tab and a lead which are bonded together according to a fourth embodiment of the present invention.

Referring to FIG. 6, in the fourth embodiment of the present invention, electrode tabs 21a extended from an electrode plate (not shown) are bent once and are connected with a lead 21b. Herein, the electrode tabs 21a are bent downward in an inverse draw-out direction of the electrode tabs 21a, that is, a direction where the electrode assembly is positioned (or toward the electrode assembly) to form a bent section 22. In addition, the lead 21b is welded onto the top of the bent electrode tabs 21a.

Here, in one embodiment, the electrode tabs 21a may be bent upward in the inverse draw-out direction of the electrode tabs 21a, and the lead 21b may be welded onto the top or the bottom of the electrode tabs 21a. Further, the draw-out lengths of the electrode tabs 21a may be formed to increase from the inside to the outside of a bent portion so that the electrode tabs 21a are easily bent and the electrode tabs 21a may be formed to be positioned inside the width of the electrode assembly or between endpoints defined by the thickness of the electrode assembly.

Figure 7:
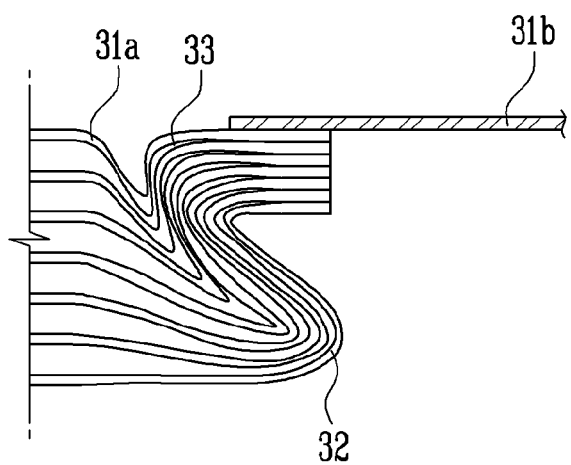
FIG. 7 is a cross-sectional view showing a bent electrode tab and a lead which are bonded to each other according to a fifth embodiment of the present invention.

FIG. 7 is a cross-sectional view showing a bent electrode tab and a lead which are bonded to each other according to a fifth embodiment of the present invention.

Referring to FIG. 7, in the fifth embodiment of the present invention, electrode tabs 31a extended from an electrode plate are bent twice and are connected with a lead 31b. Herein, the electrode tabs 31a are bent in an inverse draw-out direction of the electrode tabs 31a to form a first bent section 32 and in addition, they are bent in a draw-out direction of the electrode tabs 31a (or away from the electrode assembly) to form a second bent section 33.

That is, the electrode tabs 31a are bent (or bent upward) in the direction where the electrode assembly is positioned to form the first bent section 32 and in addition, they are bent (or bent upward) in the direction where the lead 31b is positioned to form the second bent section 33. In addition, the lead 31b is welded onto the top of the electrode tabs 31a which are bent twice. Herein, although not shown in the figure, the lead 31b may be welded onto the bottom of the electrode tabs 31a which are bent twice.

Figure 8:
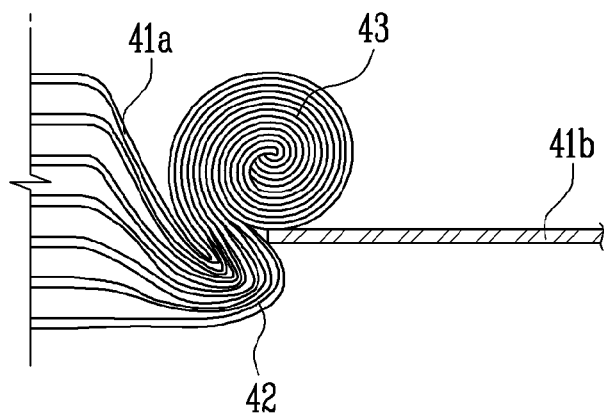
FIG. 8 is a cross-sectional view showing a bent and wound electrode tab and a lead which are bonded to each other according to a sixth embodiment of the present invention.

FIG. 8 is a cross-sectional view showing a bent and wound electrode tab and a lead which are bonded to each other according to a sixth embodiment of the present invention.

Referring to FIG. 8, in the sixth embodiment of the present invention, electrode tabs 41a extended from an electrode plate are bent once in an inverse draw-out direction of the electrode tabs 41a and thereafter, are wound (e.g., in the clockwise direction) and are connected with a lead 41b. Herein, the electrode tabs 41a are bent upward in the direction where the electrode assembly is positioned to form a bent section 42 and wound in the clockwise direction to form a wound section 43. In addition, the lead 41b is welded between the bent section 42 and the wound section 43. Further, the lead 41b may alternatively be welded onto the top of the wound section 43.

Also, in one embodiment, the draw-out lengths of the electrode tabs 41a may be formed to increase from the inside to the outside of a bent and wound portion so that the electrode tabs 41a are easily bent and wound and the electrode tabs 41a may be formed to be positioned inside the width of the electrode assembly or between endpoints defined by the thickness of the electrode assembly.

Figure 9:
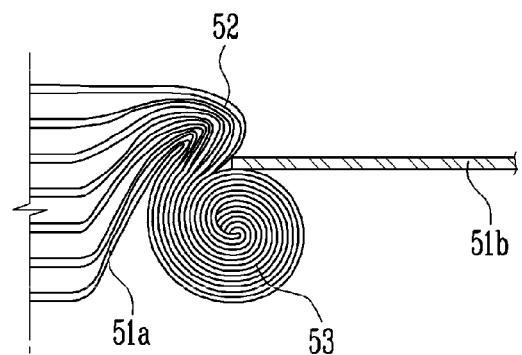
FIG. 9 is a cross-sectional view showing a bent and wound electrode tab and a lead which are bonded to each other according to a seventh embodiment of the present invention.

FIG. 9 is a cross-sectional view showing a bent and wound electrode tab and a lead which are bonded to each other according to a seventh embodiment of the present invention.

Referring to FIG. 9, in the seventh embodiment of the present invention, electrode tabs 51a extended from an electrode plate are bent once in an inverse draw-out direction of the electrode tabs 51a and thereafter, they are wound (e.g., in the clockwise direction) and connected with a lead 51b. The electrode tabs 51a are bent (or bent downward) in the direction where the electrode assembly is positioned to form a bent section 52 and wound in the counterclockwise direction to form a wound section 53. In addition, the lead 51b is welded between the bent section 52 and the wound section 53. Further, the lead 51b may alternatively be welded onto the top of the wound section 53.

Figure 10A:
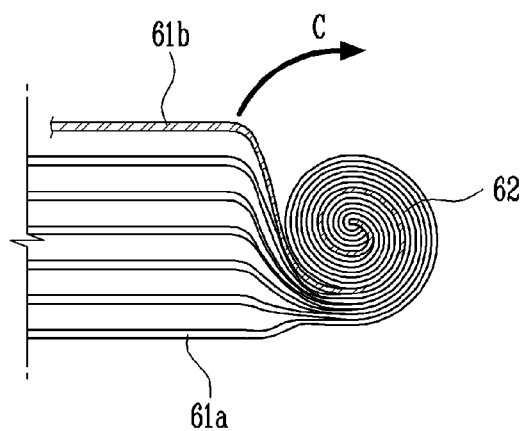
FIG. 10A is a cross-sectional view showing an electrode tab and a lead which are wound together according to an eighth embodiment of the present invention.
Figure 10B:
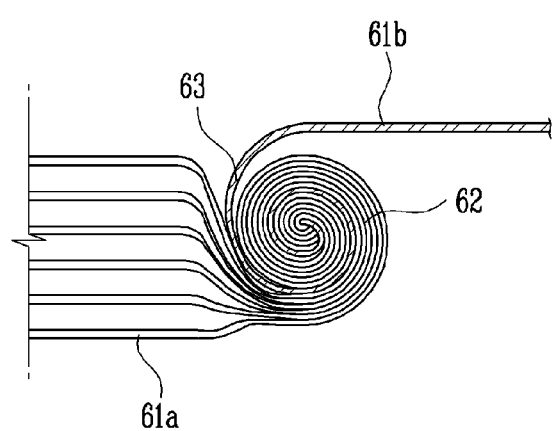
FIG. 10B is a cross-sectional view showing a lead which is bent in a direction opposite to an electrode assembly according to the eighth embodiment of the present invention.

FIG. 10A is a cross-sectional view showing an electrode tab and a lead which are wound together according to an eighth embodiment of the present invention and FIG. 10B is a cross-sectional view showing a lead which is bent in a direction opposite to (or away from) an electrode assembly according to an eighth embodiment of the present invention.

Referring to FIGS. 10A and 10B, after a lead 61b is positioned on the top of electrode tabs 61a drawn out from an electrode plate, the lead 61b and the electrode tabs 61a are together wound in the counterclockwise direction to form a wound section 62 so that the lead 61b is positioned at the innermost side. In addition, the end (the end of a lead positioned at the electrode assembly side) of an unwound portion of lead 61b is pulled in a direction (direction C) opposite to (or away from) the electrode assembly to form a bent section 63 where the end of the unwound lead 61b is bent in the direction opposite to the electrode assembly. Thereafter, a bonding strength is reinforced by welding the electrode tabs 61a and the lead 61b to each other.

According to the eighth embodiment of the present invention, it is possible to improve the utilization of the inner space of the exterior case by winding the electrode tabs 61a and the lead 61b together, and it is possible to reduce the number of processes (or to simplify manufacturing) by winding the electrode tabs 61a and the lead 61b together.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly comprising:
a plurality of first plates of a first polarity;
a plurality of second plates of a second polarity alternately arranged with the first plates;
at least one of a plurality of first tabs or a plurality of second tabs extending from the first plates or the second plates, respectively, the at least one of the plurality of first tabs or the plurality of second tabs being together wound or bent more than once;
a plurality of separators interposed between the first plates and the second plates; and
a lead physically coupled to at least one of the first tabs or the second tabs,
wherein a first surface of the lead contacts an innermost tab and a second surface of the lead contacts an outermost tab of the at least one of the plurality of first tabs or the plurality of second tabs, the first surface and the second surface being opposite surfaces of the lead.

2. The electrode assembly of claim 1, wherein the first plates, the second plates and the separators between the first plates and the second plates are laminated together.

3. The electrode assembly of claim 1, wherein the at least one of the plurality of first tabs or the plurality of second tabs are wound.

4. The electrode assembly of claim 1, wherein the at least one of the plurality of first tabs or the plurality of second tabs extend from the first plates or the second plates, respectively, by different draw-out lengths.

5. The electrode assembly of claim 4, wherein the different draw-out lengths of the at least one of the plurality of first tabs or the plurality of second tabs sequentially increase from a first side of the electrode assembly to a second side of the electrode assembly.

6. The electrode assembly of claim 1, wherein the at least one of the plurality of first tabs or the plurality of second tabs is located between end points defining the thickness of the electrode assembly.

7. The electrode assembly of claim 1, wherein the lead is wound together with the at least one of the plurality of first tabs or the plurality of second tabs.

8. A secondary battery comprising the electrode assembly of claim 1 and a case enclosing the first plates, the second plates, the first tabs, the second tabs, and the separators and partially enclosing the lead, the lead being physically coupled to the at least one of the first tabs or the second tabs only at a region within the case.

* * * * *